United States Patent [19]

Kitaoka

[11] 3,924,906
[45] Dec. 9, 1975

[54] ELECTRICALLY INSULATED BEARING AND FOR REDUCING SHAFT CURRENT

[75] Inventor: Hiroo Kitaoka, Chesterland, Ohio
[73] Assignee: Reliance Electric Company, Cleveland, Ohio
[22] Filed: Aug. 1, 1973
[21] Appl. No.: 384,491

[52] U.S. Cl. .............................. 308/1 R; 308/1 R
[51] Int. Cl.² ...................................... F16C 33/00
[58] Field of Search ......... 308/1 R, 15, 22, 26, 237, 308/238; 29/148.5

[56] References Cited
UNITED STATES PATENTS

| 755,703 | 3/1904 | Sanger | 308/1 R |
| 1,130,904 | 3/1915 | Honold | 308/1 R |
| 1,152,680 | 9/1915 | Wieselgreen | 308/1 R |
| 1,152,681 | 9/1915 | Wieselgreen | 308/1 R |

OTHER PUBLICATIONS

Article–N.C. Pace, "Journal–Bearing Interfaces are Subject to Thermo–Electric Effects," 8/66, In Railway Signaling & Communications.

*Primary Examiner*—Charles J. Myhre
*Assistant Examiner*—R. H. Lazarus
*Attorney, Agent, or Firm*—Woodling, Krost, Granger & Rust

[57] ABSTRACT

An electrically insulated bearing such as a sleeve or a ball bearing is disclosed for journalling a shaft relative to a stator such that currents in the shaft or in the frame do not flow through the bearing. The insulation is established by plasma or torch spraying an insulator such as a ceramic on either the bearing or the stator surface. The ceramic is impregnated with an insulating varnish to prevent contamination and to provide a smooth surface to aid in mounting the bearing in the stator.

The foregoing abstract is merely a resume of one general application, is not a complete discussion of all principles of operation or applications, and is not to be construed as a limitation on the scope of the claimed subject matter.

5 Claims, 6 Drawing Figures

ELECTRICALLY INSULATED BEARING AND FOR REDUCING SHAFT CURRENT

BACKGROUND OF THE INVENTION

This invention relates to bearings and more particularly to electrically insulated bearings.

Electric currents in rotating shafts can be either intentionally established or produced by imbalances in inductive rotating machinery. In either case it is often desirable to insulate a shaft from a stator through an insulated bearing. The problem of shaft currents in rotating inductive machinery has been recognized for decades as a substantial factor limiting bearing life. For example in an electric motor or generator, a shaft current may flow from one end of a shaft through a first bearing to a frame through a second bearing on the other end of the shaft. The current flow through the bearings results in significant degradation of the useful life. If the bearing is well lubricated and the electromotive force in the shaft is low, then only a potential will be produced across the bearing. Once the electromotive force in the shaft exceeds the dielectric strength of the lubricating film, a current will flow limited only by the resistance of the circuit. In some cases extremely high currents can be encountered causing rapid degradation of the bearing.

There are four principal sources of the shaft potential; namely, (1) induced shaft current wherein the shaft acts as a secondary of a transformer; (2) flux pulsations due to a specific ratio of rotor and stator slots; (3) electrostatic discharges through the bearing; and (4) miscellaneous remaining causes. Using the first source as an example in a multiple pole electric machine, if the reluctance in one path is unequal to the reluctance in another path, then an imbalance exists providing a net flux which rotates about the yoke. The shaft acts as a secondary of a transformer with a potential induced along the length thereof. When the potential exceeds the dielectric capacity of the oil film between the shaft and the bearings, a shaft current will flow.

The prior art has attempted to eliminate shaft currents through a bearing in several ways. In pedestal mounted machines, the pedestal extending from a frame to support a rotating shaft was insulated from the frame by a thin sheet of insulation. This was unsatisfactory since the pedestal had to be periodically checked to insure that the pedestal was not shorted to the frame by an accidental jumper such as a metal shims, ground wires and the like. In a bearing bracket motor the elimination of shaft current is more difficult. Again the prior art attempted to insulate the bearing from the stator by using a sheet of insulating material such as teflon and the like. This method was unsatisfactory since the insulation was not permanently bonded to one of the surfaces and could move during vibration of the motor. Another disadvantage was that the insulating material was soft, pliable and would flow under pressure. In order to eliminate this problem some have tried to permanently bond an insulation such as teflon to the bearing surface, but such a process required the bearing to be heated to approximately 720°F which is well above the melting point of a nickel-tin bearing babbitt. Others in the prior art applied epoxy resin to the stator and later rebored it for fit with a bearing. This method increased production costs and the epoxy was still not as hard as some of the desirable insulating materials such as ceramics.

Therefore, an object of this invention is to provide a bearing having an insulation which is fused to the surface of the bearing.

Another object of the invention is to provide an insulating surface which is hard and durable.

Another object of this invention is to provide an insulation which is fused to the surface of the bearing and which insulation has a melting point higher than the bearing melting point.

Another object of this invention is to provide an insulated bearing in which the insulation can be controlled to machining tolerances.

Another object of this invention is to provide a bearing having an insulation which does not flow under pressure.

Another object of this invention is to provide an insulated bearing wherein the insulation is an integral part of the bearing for easy assembly.

Another object of this invention is to provide an insulated bearing which is impervious to contaminants.

SUMMARY OF THE INVENTION

The invention may be incorporated in a bearing electrically insulated from a stator surface, comprising in combination, bearing means for journalling rotor means, said bearing means having a bearing surface for mounting to the stator surface to have said bearing and stator surfaces fixed for non-rotation relative to one another during rotation of said rotor means, and insulating means fused to one of said surfaces to provide a support layer for the bearing and to electrically insulate the bearing from the stator.

Other objects and a fuller understanding of the invention may be had by referring to the following description and claims, taken in conjunction with the accompanying drawing.

DESCRIPTION OF THE PREFERRED EMBODIMENT

Figure 1:
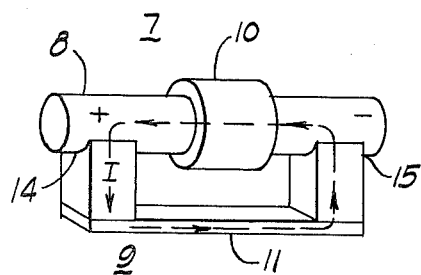
FIG. 1 illustrates a typical shaft current in a rotating electrical machine.

FIG. 1 illustrates an electrical machine comprising a rotor 7 and a stator 9 which stator comprises a frame 11 connected to bearings 14 and 15. The term stator as used herein includes any stationary part or frame. The bearings 14 and 15 journal the rotor 7 which rotor includes a shaft 8 and an armature or pulley 10. A belt running on a pulley on a shaft of a machine may generate an electrostatic potential, whereas an armature of a motor may induce a potential across the shaft of an electrical machine. In either case, a current may flow through the bearings illustrated by the induced current I shown by the arrows in FIG. 1 from shaft 8 through bearing 14, frame 11, and bearing 15 to return to shaft 8. Consequently, the bearings 14 and 15 will rapidly degrade due to the electrical current therethrough. This difficulty is encountered in large rotating electric motors or generators wherein the shaft current can reach substantial current level.

Figure 2:
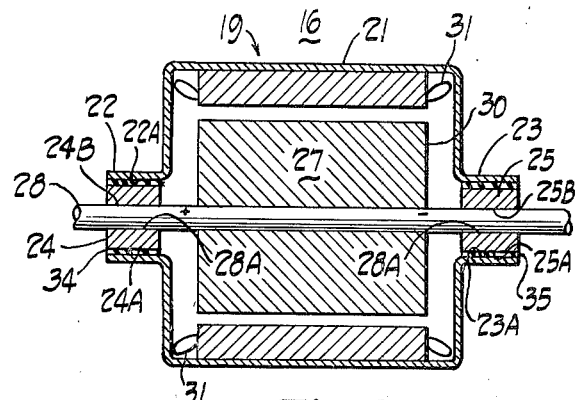
FIG. 2 is a cross section of an inductive electrical machine incorporating the present invention.

FIG. 2 is a sectional view of an inductive rotating electrical machine 16 which may be either a motor or a generator comprising a stator 19 having a frame 21 supporting bell housings 22 and 23 located on each end of the frame 21 which bell housings are adapted to receive bearings 24 and 25 respectively. The bearings 24 and 25 are shown as sleeve bearings but may be any type of bearing such as roller bearings, sleeve bearings, self-aligning bearings, and the like. The bearings 24 and 25 are mounted to the bell housings 22 and 23 to journal a rotor 27 which rotor comprises a shaft 28 and an armature 30. The armature 30 rotates within the stator 19 which stator includes the frame 21 and a stator winding 31. Each of the bell housings 22 and 23 has a stator surface 22A and 23A, respectively whereas each of the bearings 24 and 25 has bearing surfaces 24A and 24B, and 25A and 25B. The bearing surfaces 24A and 25A are adapted to cooperate with the bell housing stator surfaces 22A and 23A, respectively, and the bearing surfaces 24B and 25B are adapted to cooperate with a shaft surface 28A for journalling the shaft 28 for rotation. The cooperation between surfaces 22A – 25A occurs with the respective surfaces being substantially fixed relative to one another whereas the cooperation between the surfaces 24B and 25B with the rotor shaft surface 28A occurs with a movement between the respective surfaces.

In a conventional electromagnetic machine similar to FIG. 2 without insulating bearings, a potential may be developed by the rotor 27 as shown by the polarity on shaft 28. If the oil film between the rotor shaft surface 28A and the bearing surfaces 24B and 25B breaks down, then a shaft current will flow through shaft 28, bearing 24, frame 21 and bearing 25 to the shaft 28. The flow of current is limited only by the resistance in the circuit and may reach extremely high magnitudes. Permanent damage to the sleeve bearing will result if the current density through the bearing exceeds 1.25 amperes per square inch.

The electrical machine in FIG. 2 also includes insulating means 34 and 35 for insulating the bearings 24 and 24 from the bell housings 22 and 23 of the stator 19. The insulating means may be applied between the non-rotating surfaces of the bell housings 22 and 23 and the bearings 24 and 25. It may be applied to either the bell housing surfaces 22A and 23A or to the bearing non-rotating surfaces 24A and 25A. The insulating means between the bell housing and the rotor surface severs the circuit formed by the frame 21, the bell housings 22 and 23, bearings 24 and 25, and the shaft 28 to eliminate the current flow therethrough. A potential might still be generated across the shaft 28 due to a defective armature 30, but a current will not flow through the frame 21 as long as the insulating means 34 and 35 remains intact.

The prior art has attempted to eliminate the problem of shaft current in a manner similar to FIG. 2. However, the prior art has applied insulations such as plastics, resins, and epoxies to the bearing but such insulations have not been reliable. The insulation must be thin and hard to maintain a fixed position relative to the bell housing and the bearing and yet must not be extruded under high pressure. The plastic materials used by the prior art flowed and deformed under pressure thereby creating the possibility of movement of the plastic insulator to short the bearing to the stator. Also this could make the rotor run non-concentric to the stator for a non-uniform air gap. Others in the prior art have sintered plastic material to the bearing surface. This process is unacceptable since the sintering temperature for a popular insulating material polytetrofluorethylene sold under the trademark TEFLON is approximately 720°F. but the melting point of many bearing babbitts is only 670°F. The extreme temperature required for sintering plastic insulation will not only melt the babbitt but warp the bearing assembly requiring a subsequent machining process. Although the plastic material is bonded to the bearings surface, the material is still able to flow and deform under high pressure and does not maintain the alignment of the bearing as well as a hard insulating material. In addition, the plastic insulations cannot be interposed between moving surfaces. Others in the prior art have attempted to bond an epoxy resin to one of the surfaces, either the bearing or stator surface and subsequently machine the epoxy for proper fit. This process is undesirable since the application of the epoxy resin is not a controlled thickness operation and additional machining costs are involved.

The present invention solved the aforementioned difficulties by applying an insulating layer of a light metal oxide or a ceramic, for example aluminum oxide by techniques known to the art as plasma coating or flame spraying. The insulating coating is applied by a non-transfer plasma process wherein small particles of the insulating material are projected through an elevated temperature zone which temperature zone is established by an electric arc or burning gas. The particles are projected through the heated zone to impinge upon the bearing surface to fuse thereto and cool. Consequently, an insulating material having a melting temperature well over 2,000°C. can be fused to an unheated bearing surface having a much lower melting point without warping the bearing surface or melting the babbitt assembly therein. In addition, the thickness of the coating can be controlled to a degree that no subsequent machining is necessary. The inventor has used ceramic insulation such as aluminum oxide and the like to provide a coating between 0.005 inches and 0.010 inches thick to coat the outer surface of bearings. The ceramic insulation is coated with an electrical varnish to impregnate into the ceramic insulation and to prevent contamination thereof. The varnish does not serve as a support layer but merely a sealer to prevent contamination. The varnish also acts as a lubricant to effect movement of the bearing in the stator assembly during assembly and alignment.

Figure 3:
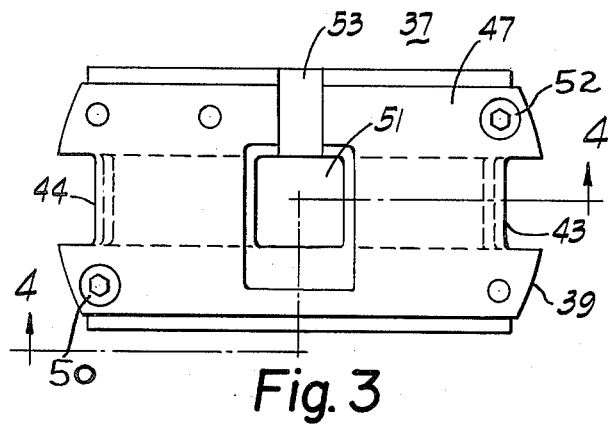
FIG. 3 is a top view of an insulated bearing.
Figure 4:
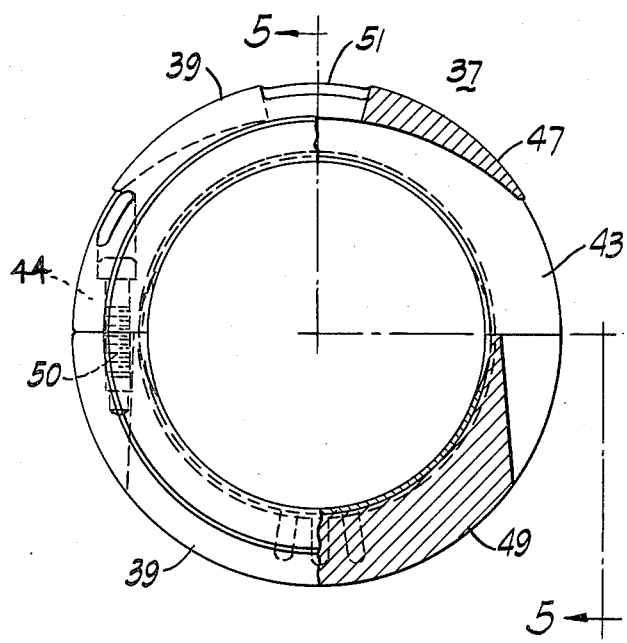
FIG. 4 is an end view of the bearing shown in FIG. 3.
Figure 5:
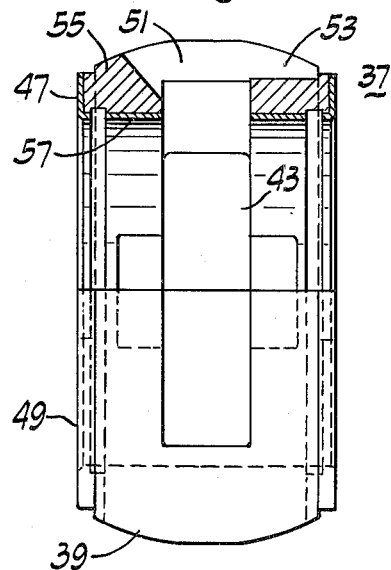
FIG. 5 is a side view of the bearing shown in FIGS. 3 and 4.

FIGS. 3–5 illustrate a top, end, and side view of a bearing 37 which the inventor has constructed in accordance with this invention. The bearing 37 is capable of journalling a 3¾ inch diameter shaft making the bearing suitable for operation in large horsepower motors, for example 2,500 Hp. In an electric motor or generator of this capacity, shaft current presents a significant problem which is not encountered in small and fractional horsepower motors. In small motors, shaft currents can be ignored since the motors are generally built with a sufficient inherent safety factor. However, in the larger machines, the shaft current problem is greater and must be recognized and dealt with in order to maintain a competitive product.

The bearing 37 shown in FIGS. 3–5 is a self-aligning sleeve bearing having an outer spherical portion 39 which is the surface that is covered with a coating of insulating material or means. The surface 39 is interrupted by apertures 43 and 44 to provide access to a journalled shaft, not shown, for an oil ring. The apertures 43 and 44 are shown more clearly in FIG. 4 where an oil ring will contact the shaft at the 12 o'clock position within the bearing and extend outside and below the bearing in the 6 o'clock position to contact an oil reservoir. The bearing 37 includes an upper portion 47 and a lower portion 49 secured together by screws 50 and 52. An aperture 51 in the upper portion 47 provides a window for determining whether the oil ring is providing proper lubrication to the journalled shaft. A slot 53 provides a keyway for a ceramic key to eliminate the possibility of rotation of the bearing within the stator housing during operation. The keyway is made as a slot to allow for a tilt in the self-aligning bearing. FIG. 5 shows the outer portion 55 of the bearing is made of one material typically cast iron with an inner babbitt 57 of a second material such as nickel tin providing a proper surface for journalling the shaft.

Figure 6:
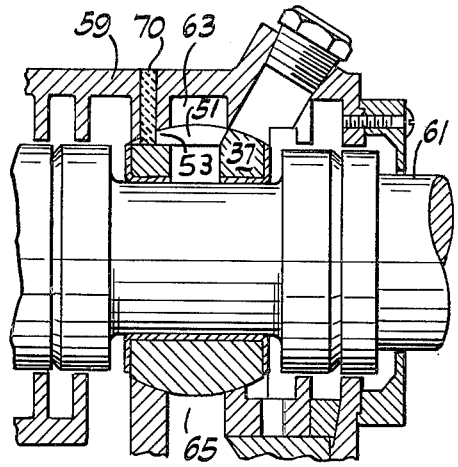
FIG. 6 is a partial cross section of an inductive machine incorporating the bearing shown in FIGS. 3–5.

FIG. 6 is a sectional view of an electrical machine showing the bearing 37 installed in a stator 59 for journalling a shaft 61. Aperture 63 in the stator surface provides access to the inspection window 51 to determine whether proper lubrication is available to the shaft 61, whereas aperture 65 enables access to an oil reservoir by the oil ring, not shown, extending from the inner portion of the bearing through apertures 43 and 44. A ceramic key 70 extends into the bearing 37 and more particularly into slot 53 to prevent rotation of the bearing about the axis of the shaft 61. The insulation applied between the stator 59 and the shaft 61 can be applied either to the stator surface or the bearing surface adjacent to the stator surface. Although the insulating material can be placed on any of these surfaces, the inventor has determined that insulation on the bearing surface adjacent the stator 59 is the most desirable. The insulated bearing finds application for preventing shaft currents in motor and generator machines and also where an insulated shaft is desired such that the shaft may operate at some applied potential.

The invention may be incorporated in the method of reducing electrical current through a bearing having a bearing surface which bearing is established between a rotor surface and a stator surface comprising the steps of establishing a clearance between the bearing and the stator surface to allow for a thickness of an insulating material. Preparing the surface for deposition may include roughening the surface by sandblasting one of the bearing and stator surfaces. The method includes heating the insulating material which may be accomplished by establishing an elevated temperature zone by electric arc or by burning gas and projecting the insulating material through the heated zone. Depositing the insulating material on the prepared surface may comprise spraying the insulating material through the zone to impinge on the prepared surface until the thickness is equal to the clearance. The method may include applying a second insulator such as a varnish to impregnate the insulating material and curing the second insulator varnish by the application of heat.

The foregoing specification has disclosed a bearing and a method for reducing electric current through a bearing which bearing is shown and described in FIG. 2 insulated from a stator surface 22A comprising in combination; bearing means 24 for journalling rotor means 27, the bearing means 24 has bearing surface 24A for mounting to the stator surface 22A to have the bearing and stator surfaces fixed for non-rotation relative to one another during rotation of the rotor means 27. The bearing includes insulated means 34 fused to one of the surfaces 22A and 24A to provide a support layer for the bearing and to electrically insulate the bearing from the stator.

The specification also discloses a method of reducing electric current through the bearing 24 having a bearing surface 24A and 24B established between a rotor surface 28A and a stator surface 22A comprising steps of preparing a surface either 22A or 24A for deposition; heating an insulating material and depositing the insulating material on the prepared surface.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A bearing electrically insulated from a stator surface, comprising in combination:
   bearing means for journalling rotor means,
   said bearing means having a bearing surface for mounting to the stator to have said bearing and stator fixed for non-rotation relative to one another during rotation of said rotor means,
   said bearing means having a bearing babbitt with a first melting point which bearing babbitt is thermally coupled to said bearing surface,
   a ceramic insulating means having a second melting point greater than said first melting point and hot sprayed to said bearing surface to provide a support layer for the bearing and to electrically insulate the bearing from the stator with an insulator having a higher melting point than said bearing babbitt;
   and a second insulator impregnated into said ceramic insulating means to prevent contamination thereof.

2. An electrically insulated bearing as set forth in claim 1 including ceramic key means established between said stator and bearing means to prevent rotation thereof.

3. A bearing electrically insulated from a stator surface, comprising in combination:
   bearing means for journalling rotor means;
   said bearing means having a bearing surface for mounting to the stator to have said bearing and stator fixed for non-rotation relative to one another during rotation of said rotor means;
   said bearing means having a bearing babbitt with a first melting point which bearing babbitt is thermally coupled to said bearing surface;
   and ceramic insulating means having a second melting point greater than said first melting point and hot sprayed on said bearing surface to provide a support layer for the bearing and to electrically insulate the bearing from the stator with an insulator having a higher melting point than said bearing babbitt.

4. An electrically insulated bearing as set forth in claim 3 including;
   a second insulator impregnated into said ceramic insulating means.

5. An electrically insulated bearing as set forth in claim 3 including insulating key means between said stator surface and said bearing surface to prevent rotation therebetween.

* * * * *